(12) United States Patent
Yamashita et al.

(10) Patent No.: US 11,152,720 B2
(45) Date of Patent: Oct. 19, 2021

(54) TERMINAL-EQUIPPED WIRE AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Takuya Yamashita, Yokkaichi (JP); Tetsuya Nakamura, Yokkaichi (JP); Yoshiaki Yamano, Yokkaichi (JP); Takaaki Ito, Yokkaichi (JP); Junichi Ono, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/756,648

(22) PCT Filed: Oct. 18, 2018

(86) PCT No.: PCT/JP2018/038775
§ 371 (c)(1),
(2) Date: Apr. 16, 2020

(87) PCT Pub. No.: WO2019/082780
PCT Pub. Date: May 2, 2019

(65) Prior Publication Data
US 2020/0266557 A1  Aug. 20, 2020

(30) Foreign Application Priority Data
Oct. 25, 2017  (JP) .............................. JP2017-205924

(51) Int. Cl.
*H01B 7/00* (2006.01)
*H01B 7/28* (2006.01)
(Continued)

(52) U.S. Cl.
CPC ............. *H01R 4/70* (2013.01); *H01B 7/0045* (2013.01); *H01B 7/2806* (2013.01); *H01R 4/185* (2013.01);
(Continued)

(58) Field of Classification Search
CPC ...... H01B 7/0045; H01B 7/2806; H01B 7/00; H01B 7/28; H01B 7/02; H01B 7/282;
(Continued)

(56) References Cited

U.S. PATENT DOCUMENTS 5,326,273 A * 7/1994 Kamon .................... H01R 4/62
174/94 R
10,854,353 B2 * 12/2020 Yamashita ............... H01R 4/18
(Continued)

FOREIGN PATENT DOCUMENTS

JP  2003-115353 A    4/2003
JP  2003115353 A *  4/2003  ............. H01R 13/46
(Continued)

OTHER PUBLICATIONS

Dec. 25, 2018 Search Report issued in International Patent Application No. PCT/JP2018/038775.

*Primary Examiner* — Timothy J Thompson
*Assistant Examiner* — Guillermo J Egoavil
(74) *Attorney, Agent, or Firm* — Oliff PLC

(57) ABSTRACT

A terminal-equipped wire in which a terminal fitting and a wire obtained by covering an outer periphery of a conductor with an insulating covering are electrically connected to each other at an electric connection, the terminal-equipped wire including a resin covering that is made of a resin
(Continued)

material, and covers the electric connection, wherein: the resin covering includes, in a region that covers at least part of the terminal fitting, a first covering layer that is in contact with a surface of the terminal fitting and a second covering layer that covers at least part of the first covering layer, and the first covering layer has a recess, and the recess is covered by the second covering layer.

7 Claims, 10 Drawing Sheets

(51) Int. Cl.
  *H01R 4/62*    (2006.01)
  *H01R 4/70*    (2006.01)
  *H01R 4/18*    (2006.01)
  *H01R 13/52*    (2006.01)
  *H02G 15/04*    (2006.01)

(52) U.S. Cl.
  CPC .......... *H01R 4/62* (2013.01); *H01R 13/5216* (2013.01); *H02G 15/04* (2013.01)

(58) Field of Classification Search
  CPC .......... H01R 4/184; H01R 4/185; H01R 4/62; H01R 4/70; H01R 4/18; H01R 13/5216; H01R 13/52; H02G 1/14; H02G 15/04
  USPC ...................................................... 174/138 F
  See application file for complete search history.

(56) References Cited

U.S. PATENT DOCUMENTS

| | | |
|---|---|---|
| 2013/0199842 A1 | 8/2013 | Inoue et al. |
| 2013/0292173 A1 | 11/2013 | Inoue et al. |
| 2013/0303019 A1* | 11/2013 | Ito .................. H01R 13/533 |
| | | 439/521 |
| 2015/0047900 A1 | 2/2015 | Suetani et al. |
| 2019/0214744 A1 | 7/2019 | Yamashita |

FOREIGN PATENT DOCUMENTS

| | | | | |
|---|---|---|---|---|
| JP | 2003-297447 A | 10/2003 | | |
| JP | 2012-089431 A | 5/2012 | | |
| JP | 2012-174447 A | 9/2012 | | |
| JP | 2012-174449 A | 9/2012 | | |
| JP | 2016-081849 A | 5/2016 | | |
| JP | 2016126981 A | * 7/2016 | ............ | H01R 13/52 |
| JP | 2017-195137 A | 10/2017 | | |
| WO | 2013/132929 A1 | 9/2013 | | |

* cited by examiner

TERMINAL-EQUIPPED WIRE AND WIRE HARNESS

BACKGROUND

The present disclosure relates to a terminal-equipped wire and a wire harness, and more particularly relates to a terminal-equipped wire including a resin covering portion, which is for corrosion protection, at an electric connection portion where a conductor and a terminal fitting are connected to each other, and to a wire harness that uses the terminal-equipped wire.

Wires disposed in vehicles, such as automobiles, include a conductor connected to a terminal fitting at an end of a wire. An electric connection portion in which the terminal fitting is electrically connected to the conductor of the wire requires corrosion protection. The electric connection portion may particularly include different metal materials that come into contact with each other, in which case, dissimilar metal corrosion may occur. The wire for use in vehicles may include a conductor made of aluminum or an aluminum alloy to reduce the weight of the vehicle, for example. On the other hand, the terminal fitting may be made of copper or a copper alloy, and the surface of the material may be often plated with tin or the like. In this case, in the electric connection portion in which the aluminum-based metal comes into contact with the copper-based metal or the tin-plated layer, dissimilar metal corrosion is likely to be a problem. Reliable corrosion prevention is thus required for the electric connection portion.

To prevent corrosion of an electric connection portion, there are well known techniques where the electric connection portion is covered by a resin material. For example, JP 2003-297447A discloses a connection terminal device provided with a water-proofing portion that covers a wire and a wire connection portion for connecting the wire to a connection terminal fitting, and has a predetermined thickness on one side of the wire connection portion. The water-proofing portion of JP 2003-297447A is constituted by a resin mold or tube, and is tubular-shaped while covering the entire electric connection portion. Also, JP 2016-81849A discloses that, when forming a resin covering portion that encloses a connection portion of a terminal connected to a wire end, a projection piece formed at a portion of the terminal other than the connection portion is used to position the terminal with respect to a mold.

SUMMARY

In a terminal-equipped wire, if, as described in JP 2003-297447A, the entire region of an electric connection portion between a terminal fitting and a wire conductor is covered by a resin material, corrosion in the electric connection portion can be efficiently prevented. On the other hand, the terminal-equipped wire is typically used in a state in which part of the terminal fitting is inserted into a connector housing made of resin, but in view of downsizing of the connector housing, the cavity into which the terminal fitting is inserted only has a margin in size to the extent of within manufacturing tolerances of the terminal fitting and the connector housing, and often has almost no clearance between the terminal fitting and the connector housing. If a user tries to insert a terminal fitting of a terminal-equipped wire provided with a resin covering portion at an electric connection portion into a typical conventional connector housing, for which insertion of such a terminal-equipped wire provided with a resin covering portion is not intended, the insertion will be significantly difficult or will be impossible due to the thickness of a resin material that constitutes the resin covering portion. A connector housing that is separately designed to match the size of the resin covering portion can be used, but if this is the case, the entire connector housing will be large due to the thickness of the resin covering portion. Particularly, if, as the water-proofing portion of JP 2003-297447A, the resin covering portion is tubular-shaped with a predetermined thickness, the aforementioned problems are particularly noticeable.

Therefore, it is desirable to form a thin resin covering portion that covers an electric connection portion of a terminal-equipped wire. To reliably cover a portion that requires corrosion prevention with the thin resin covering portion, when the resin covering portion is formed through injection molding using a mold, it is important to perform accurate positioning between the mold and the terminal-equipped wire. Although, as described in JP 2016-81849A, the projection piece provided on the terminal fitting can be used to position the terminal fitting with respect to the mold, this method is not applicable to a case where the terminal fitting is not provided with an appropriate projection piece. Furthermore, it is difficult to supply a resin material at a position at which a projection piece and a mold come into contact with each other, and if the projection piece is provided at a portion that requires corrosion prevention using the resin material or in the vicinity thereof, sufficient anticorrosive performance is not likely to be realized.

An exemplary aspect of the disclosure provides a terminal-equipped wire and a wire harness in which an electric connection portion between a terminal fitting and a wire conductor is covered by a resin covering portion, and that can easily ensure high anticorrosive performance even if a resin material that constitutes the resin covering portion is thin.

According to the present disclosure, a terminal-equipped wire in which a terminal fitting and a wire obtained by covering an outer periphery of a conductor with an insulating covering are electrically connected to each other at an electric connection, the terminal-equipped wire including a resin covering that is made of a resin material, and covers the electric connection, wherein the resin covering includes, in a region that covers at least part of the terminal fitting, a first covering layer that is in contact with a surface of the terminal fitting and a second covering layer that covers at least part of the first covering layer, and the first covering layer has a recess, and the recess is covered by the second covering layer.

Here, the recess may be a gap in which the surface of the terminal fitting is not covered by a resin material that forms the first covering layer.

The terminal fitting may include a barrel that is capable of crimping the wire, and the recess may be provided at a position that corresponds to the barrel.

The second covering layer may have a covering end edge that covers the first covering layer at an end, in a longitudinal direction, of the terminal-equipped wire, and the covering end edge of the second covering layer may be provided at least over the entire periphery except for a region located in a bottomward direction, the bottomward direction intersecting with the longitudinal direction and being directed to a side opposite to a side on which the conductor is arranged on the terminal fitting.

In this case, the first covering layer may have higher adhesion to the surface of the terminal fitting than the second covering layer, and the covering end edge may be located at a front-end of the second covering layer in the longitudinal direction of the terminal-equipped wire.

Furthermore, the second covering layer may have shrunk at the covering end edge of the second covering layer, in a direction of pressing against the first covering layer.

Also, at least in a portion that covers the terminal fitting, the second covering layer may not be provided in the region located in the bottomward direction.

According to the present disclosure, a wire harness includes the above-described terminal-equipped wire.

In the terminal-equipped wire according to the present disclosure, the first covering layer includes a recess, and the recess is covered by the second covering layer. Accordingly, even if, due to the process of manufacturing the first covering layer or the like, the layer of the resin material becomes thinner than that of the surrounding portion to generate a recess in the first covering layer, the presence of the recess is not likely to lead to corrosion of the terminal fitting itself or the electric connection. Accordingly, it is not necessary to form an excessively thick first covering layer to avoid formation of a recess, making it possible to form a thin resin covering.

When, for example, the first covering layer is formed through injection molding using a mold, if the mold is provided with a positioning member that can come into contact with or come closer to the terminal fitting to position the terminal fitting with respect to the mold, such a situation that the terminal fitting is misaligned with respect to the mold when a melted resin material is poured into the mold is not likely to occur. Accordingly, the first covering layer does not need to be designed to be thick taking into consideration such a misalignment. As a result, it is possible to accurately form a thin first covering layer at a position on the surface of the terminal fitting including the electric connection at which corrosion prevention is required. At this time, because a resin material is not likely to be placed at a position at which the positioning member was in contact with or close to the terminal fitting, a recess in which the layer of the resin material is thin is formed, but by covering this recess with the second covering layer as described above, it is possible for the resin covering as a whole to efficiently suppress corrosion of the electric connection that may be caused by the entry of a corrosion factor such as water.

Here, a case is taken where the recess is a gap in which the surface of the terminal fitting is not covered by a resin material that forms the first covering layer. When the first covering layer is formed, a positioning member is brought into contact with the terminal fitting to accurately position the terminal fitting, and even if such a gap is generated in the first covering layer, the gap can be covered by the second covering layer, thereby making it possible to ensure high anticorrosive performance for the resin covering as a whole. As a result, it is easy to realize both making a resin covering layer thin due to the high positioning accuracy, and ensuring anticorrosive performance.

If the terminal fitting includes a barrel that is capable of crimping the wire, and the recess is provided at a position that corresponds to the barrel, it is easy to form a particularly thin resin covering while ensuring the anticorrosive performance of the resin covering. This is because the barrel is a portion that connects a wire and a terminal fitting that are separate members, and thus has a small manufacturing tolerance, and when the positioning member for forming a recess is provided on the mold to position the terminal fitting, the positioning member can be reliably brought into or closer to the terminal fitting. As a result, it is possible to accurately form a thin first covering layer at a position on the surface of the terminal fitting including the electric connection at which corrosion prevention is required.

If the second covering layer has a covering end edge that covers the first covering layer at an end, in a longitudinal direction, of the terminal-equipped wire, and the covering end edge of the second covering layer is provided at least over the entire periphery except for a region located in a bottomward direction, the bottomward direction intersecting with the longitudinal direction and being directed to a side opposite to a side on which the conductor is arranged on the terminal fitting, the first covering layer and the second covering layer are not likely to disengage from each other at an end edge in the longitudinal direction. As a result, such a situation that a corrosion factor such as salt water enters the electric connection from an interface between the first covering layer and the second covering layer via the recess or the like and causes corrosion of the electric connection is not likely to occur.

Here, with a configuration in which the first covering layer has higher adhesion to the surface of the terminal fitting than the second covering layer, and the covering end edge is located at a front-end of the second covering layer in the longitudinal direction of the terminal-equipped wire, the intimate adhesion of the first covering layer to the terminal fitting can easily prevent the entry of a corrosion factor via an interface between the resin covering and the terminal fitting. Also, the second covering layer is not likely to disengage from the surface of the first covering layer in areal adhesion with the surface of the terminal fitting, and thus, in the front-end of the resin covering, it is also easy to prevent the entry of a corrosion factor from an interface between the first covering layer and the second covering layer. Therefore, corrosion of the electric connection that may be caused due to the entry of a corrosion factor from an end on the terminal fitting side of the resin covering can be particularly efficiently suppressed.

Furthermore, with the configuration in which the second covering layer has shrunk at the covering end edge of the second covering layer in a direction of pressing against the first covering layer, the second covering layer is firmly adhered to the first covering layer due to the second covering layer pressing the first covering layer. Accordingly, it is possible to highly realize suppression of the entry of a corrosion factor from an interface between the first covering layer and the second covering layer.

Also, with the configuration in which, at least in a portion that covers the terminal fitting, the second covering layer is not provided on the region located in the bottomward direction, when the terminal fitting is inserted into a connector housing and is used, the distance between the bottom of the terminal fitting and the inner wall surface of the connector housing can be reduced. Accordingly, even when the connector housing is designed to be small, the resin covering that covers the portion on the side on which the conductor is disposed on the terminal fitting can be made thick. Accordingly, it is possible to efficiently realize corrosion prevention at a position at which the terminal fitting and the conductor are in contact with each other, and that requires particularly high anticorrosive performance, without increasing the size of the connector housing as a whole.

The wire harness according to the present disclosure includes the above-described terminal-equipped wire, and in the electric connection between the terminal fitting and the wire conductor, the recess for forming a thin first covering layer that was generated by the positioning member or the like is covered by the second covering layer. Therefore, even if a thin resin covering that covers the electric connection is formed, high anticorrosive performance can be achieved.

DETAILED DESCRIPTION OF EMBODIMENTS

Hereinafter, embodiments of the present disclosure will be described in detail with reference to the drawings.

Terminal-Equipped Wire

Overall Configuration

Figure 1:
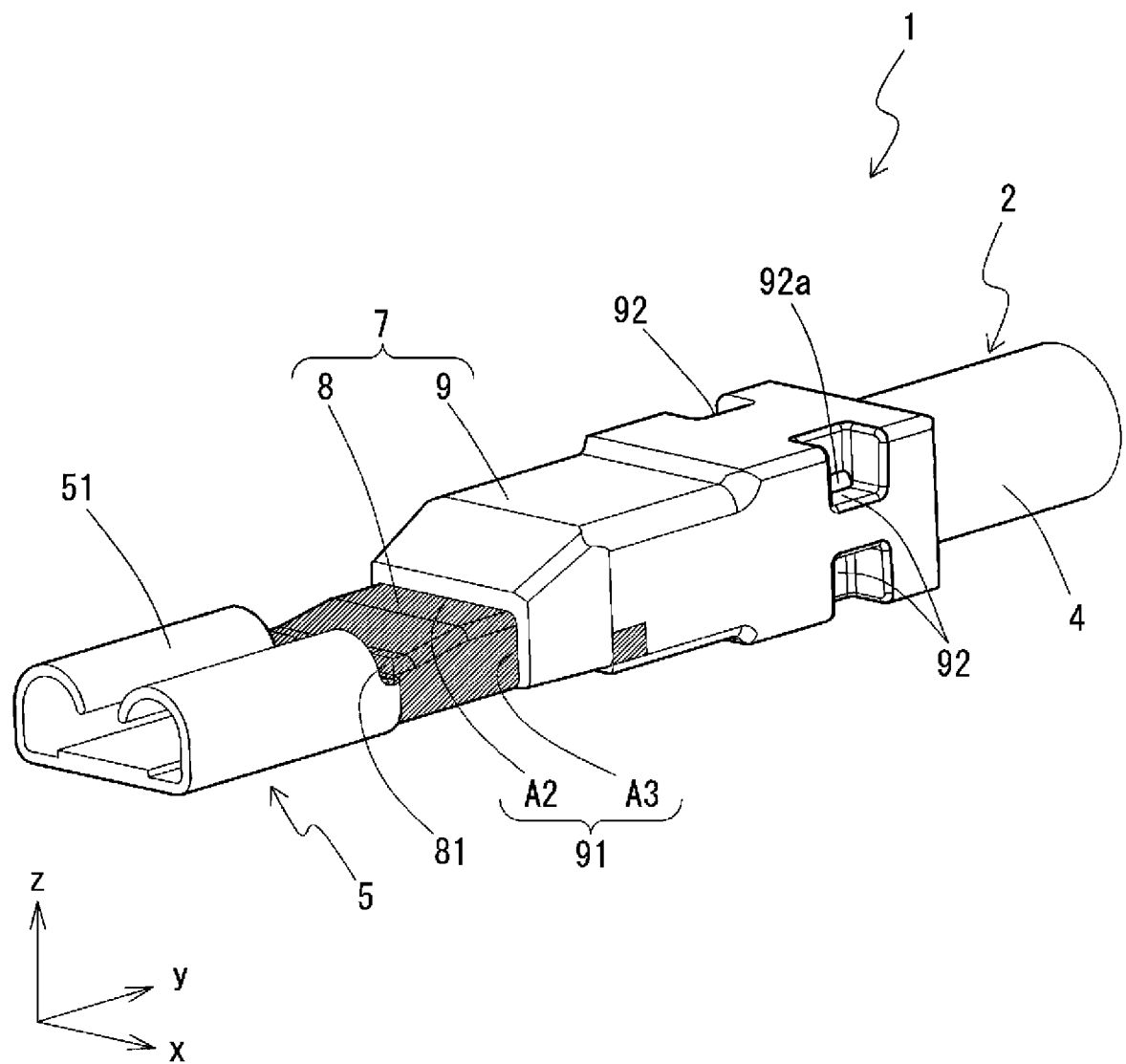
FIG. 1 is a perspective view illustrating a terminal-equipped wire according to an embodiment of the present disclosure, in which a first covering layer is hatched (the same applies to the subsequent figures).
Figure 2:
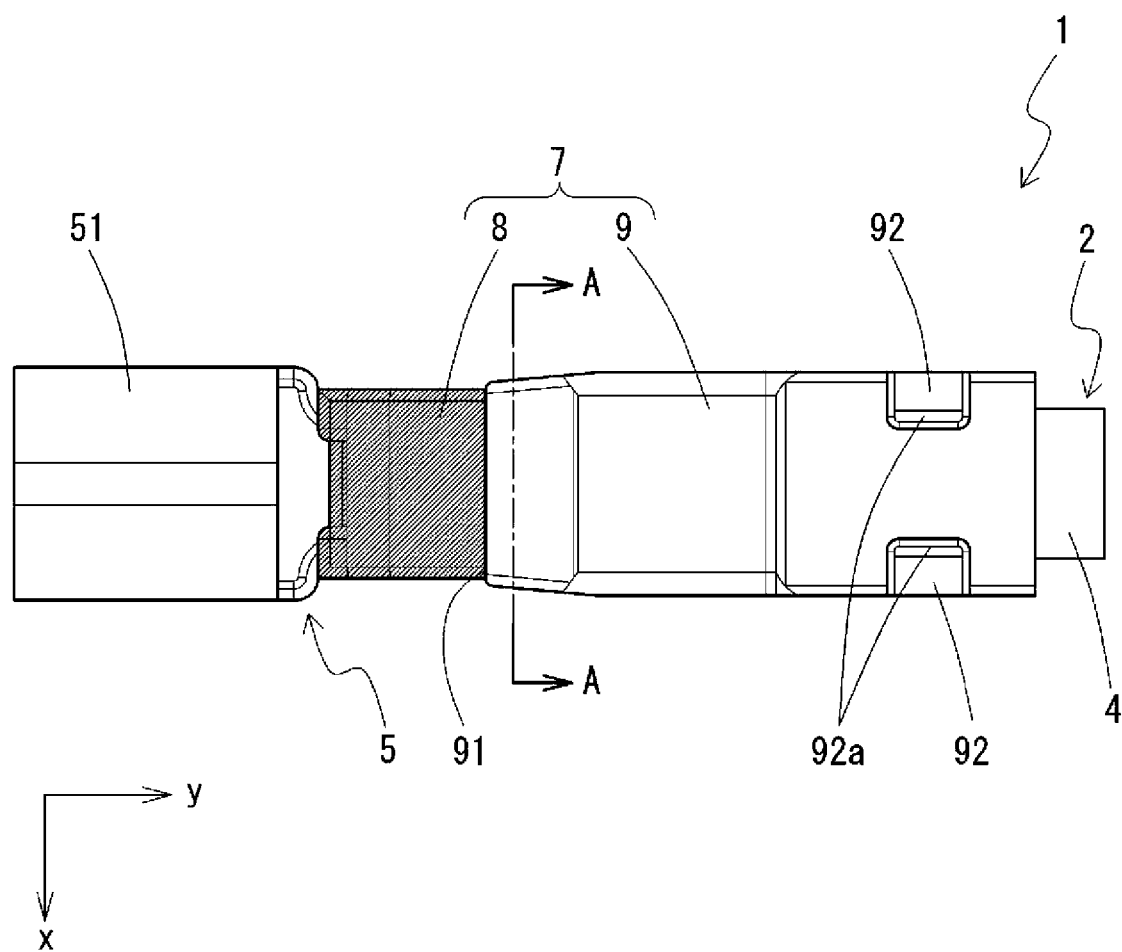
FIG. 2 is a plan view of the terminal-equipped wire.
Figure 3:
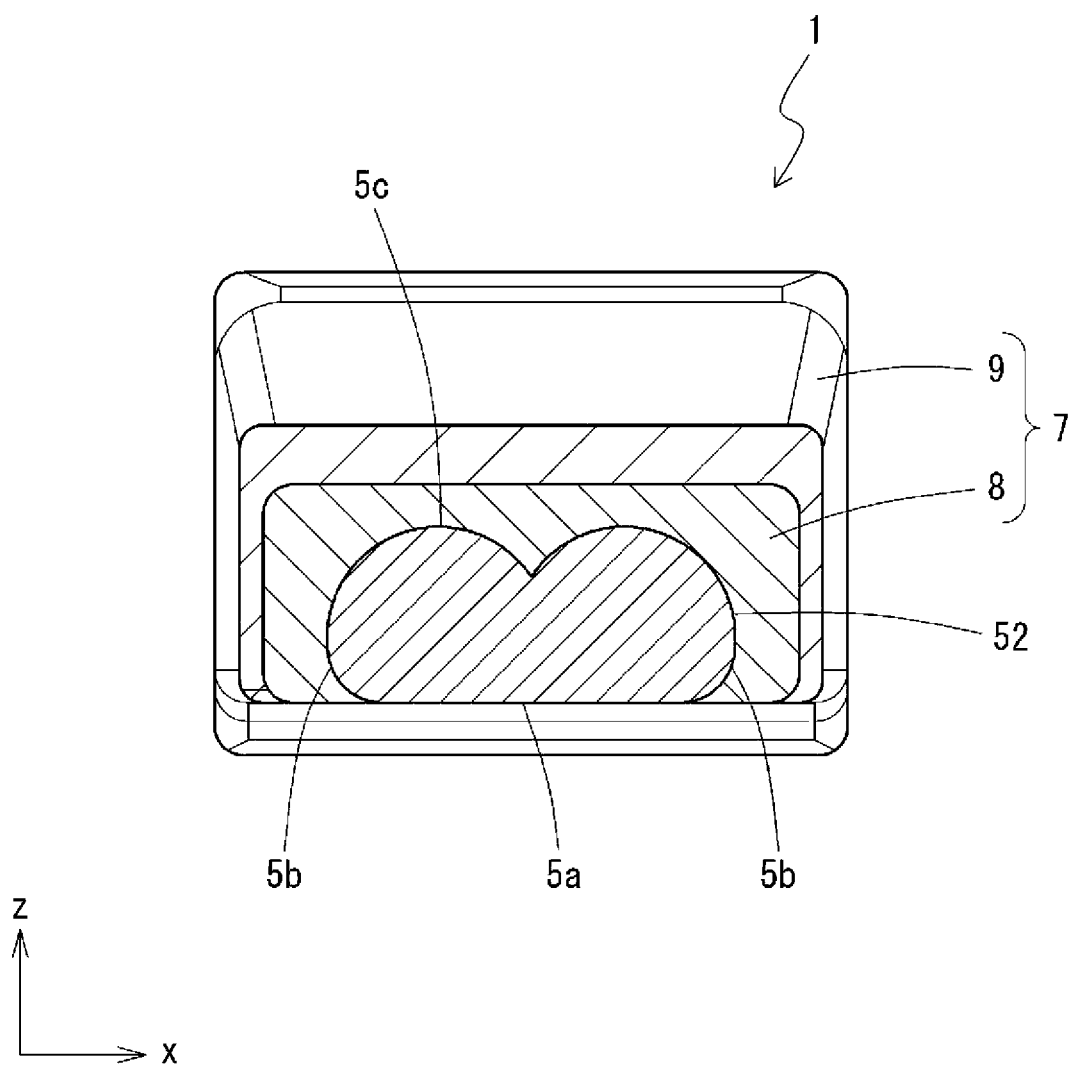
FIG. 3 is a cross-sectional view taken along a line A-A in FIG. 2, in which inner structure of a region enclosed by a material that constitutes a terminal fitting is omitted (the same applies to the subsequent cross-sectional views).

First, the overall configuration of a terminal-equipped wire 1 according to an embodiment of the present disclosure is shown in FIGS. 1 to 3. The terminal-equipped wire 1 according to the embodiment of the present disclosure has a configuration in which a conductor 3 of a wire 2 and a terminal fitting 5 are electrically connected to each other at an electric connection portion 6 (electric connection), the conductor 3 being covered by an insulating covering 4 (see FIG. 7). Also, the terminal-equipped wire 1 includes a resin covering portion 7 (resin covering) that is made of a resin material and covers a portion including the electric connection portion 6.

In the present description, the longitudinal direction of the terminal-equipped wire 1 in FIG. 1, that is, the axial direction of the wire 2 is defined as "y direction". A direction to the rear side on which the wire 2 is disposed is defined as "+y direction", and a direction to the front side on which the terminal fitting 5 is disposed is defined as "−y direction". Also, the up-down direction that corresponds to the height direction of the terminal fitting 5 is defined as "z direction". A direction (upper surface direction) to the upper side on which the wire 2 is disposed on the terminal fitting 5 is defined as "+z direction", and an opposite direction (bottom surface direction) to the lower side is defined as "−z direction". Furthermore, the width direction of the terminal fitting 5 that intersects with the y direction and the z direction is defined as "x direction".

The terminal fitting 5 includes a connection portion 51. The terminal fitting 5 also includes a barrel portion (barrel) that extends from and is formed integrally with the rear end side of the connection portion 51, and includes a first barrel portion (conductor fixing portion) 52 and a second barrel portion 53. The connection portion 51 is formed as a fitting connection portion of a female fitting terminal, and has the shape of being fittable to a male connection terminal (not shown). The first barrel portion 52 is formed as an integral portion of a plate-shaped bottom plate portion 52a that is contiguous from the bottom of the connection portion 51, and first crimping pieces 52b that extend from the bottom plate portion 52a to both sides in the width direction (±x directions) (see FIG. 7). Similarly, the second barrel portion 53 is also formed as an integral portion of a bottom plate portion that is contiguous from the bottom plate portion 52a of the first barrel portion, and a second crimping piece.

In the electric connection portion 6, the insulating covering 4 is stripped from an end portion of the wire 2 to expose the conductor 3. This end portion of the wire 2 at which the conductor 3 is exposed is crimped and fixed to the terminal fitting 5 on the upper surface side (+z side), so that the wire 2 and the terminal fitting 5 are connected to each other. The end portion of the wire 2, placed on the upper side (+z side) of the bottom plate surface 52a, is enclosed by the first crimping pieces 52b and the second crimping piece, and is crimped and fixed from the outer circumference of the wire 2. The first barrel portion 52 electrically connects the conductor 3 and the terminal fitting 5, and physically fixes the conductor 3 to the terminal fitting 5. On the other hand, the second barrel portion 53 fixes, on the rear side (+y side) of the first barrel portion 52, the wire 2 with a force smaller than that with which the first barrel portion 52 fixes the conductor 3, and physically fixes the wire 2 to the terminal fitting 5 in a supplementary manner. The second barrel portion 53 may be crimped and fixed to the conductor 3 exposed at the end of the wire 2 at a rearward position, or may be crimped and fixed to the wire 2 from the outer circumference of the insulating covering 4 at a further rearward position at which the conductor 3 is covered by the insulating covering 4. In the shown embodiment, the second barrel portion 53 is crimped and fixed to the exposed conductor 3.

The resin covering portion 7 spans a region from, in the longitudinal direction of the terminal-equipped wire 1, a position forward (to the −y side) of a leading end of the conductor 3 exposed at the end of the wire 2 to a position rearward (to the +y side) of a leading end of the insulating covering 4 of the wire 2, and covers the entire electric connection portion 6 and a partial region, on the terminal side, of the insulating covering 4 of the wire 2. The conductor 3 exposed at the end of the wire 2 is also completely covered by the resin covering portion 7, so as not to be exposed to the outside. The resin covering portion 7 is constituted by a first covering layer 8 and a second covering layer 9 that are made of different materials. The shapes and the arrangement of these covering layers will be described in detail later.

The terminal-equipped wire 1 can be used as a connector when the portion of the terminal fitting 5 including the electric connection portion 6 is inserted into a hollow connector housing (not shown) made of a resin material such as polybutylene terephthalate (PBT).

Configuration of Constituent Components

Hereinafter, specific configurations of the wire 2, the terminal fitting 5, and the resin covering portion 7 that constitute the terminal-equipped wire 1 will be described.

(1) Wire

The conductor 3 of the wire 2 may be constituted by a single metal wire, but is preferably constituted by a twisted wire obtained by twisting a plurality of bare wires together. In this case, the twisted wire may be made of a single type of metal bare wire, or may be made of two or more types of metal bare wires. Furthermore, the twisted wires may include, in addition to metal bare wires, bare wires made of organic fibers, or the like. The twisted wire may include a reinforcing wire (tension member) for reinforcing the wire 2, or the like.

Examples of the material of the metal bare wires constituting the above-described conductor 3 may include copper, a copper alloy, aluminum, an aluminum alloy, or a material obtained by subjecting any of these materials to any type of plating. Also, examples of the material of the metal bare wire serving as the reinforcing wire may include a copper alloy, titanium, tungsten, or a stainless steel. Furthermore, examples of the organic fiber serving as the reinforcing wire may include a kevlar.

Examples of the material of the insulating covering 4 may include rubber, polyolefin, a halogen-based polymer such as PVC, and a thermoplastic elastomer. They may be used alone or in combination of two types or more. Various types of additive agent may be added to the material of the insulating covering 4 as appropriate. Examples of the additive agent may include a fire-retardant, a filler, and a coloring agent.

(2) Terminal Fitting

Examples of the material (base material) of the terminal fitting 5 may include, in addition to typically used brass, various types of copper alloy, and copper. Part (for example, a contact) or the entirety of the surface of the terminal fitting 5 may be plated with various types of metal, such as tin, nickel, gold, or an alloy including any one of them.

While the conductor 3 and the terminal fitting 5 may be made of various metal materials as described above, if, as in a case where the terminal fitting 5 is made of a typical terminal material in which the base material made of copper or a copper alloy is plated with tin, and the conductor 3 includes bare wires made of aluminum or an aluminum alloy, dissimilar metals are in contact with each other in the electric connection portion 6, corrosion will be likely to occur particularly in the electric connection portion 6 when it comes into contact with a corrosion factor such as moisture. However, because the resin covering portion 7 as will be described below covers the electric connection portion 6, such a dissimilar metal corrosion can be prevented.

(3) Resin Covering Portion

As described above, the resin covering portion 7 covers the electric connection portion 6 between the terminal fitting 5 and the conductor 3 to prevent a corrosion factor such as water from entering the electric connection portion 6 from the outside. Therefore, the resin covering portion 7 plays a role to prevent corrosion of the electric connection portion 6 that may be caused by the corrosion factor. As described above, the resin covering portion 7 is constituted by the first covering layer 8 and the second covering layer 9 that are made of different constituent materials. The configuration of the resin covering portion 7 will be described with reference to FIGS. 1 to 6.

(3-1) Covering Portion of First Covering Layer

Figure 4:
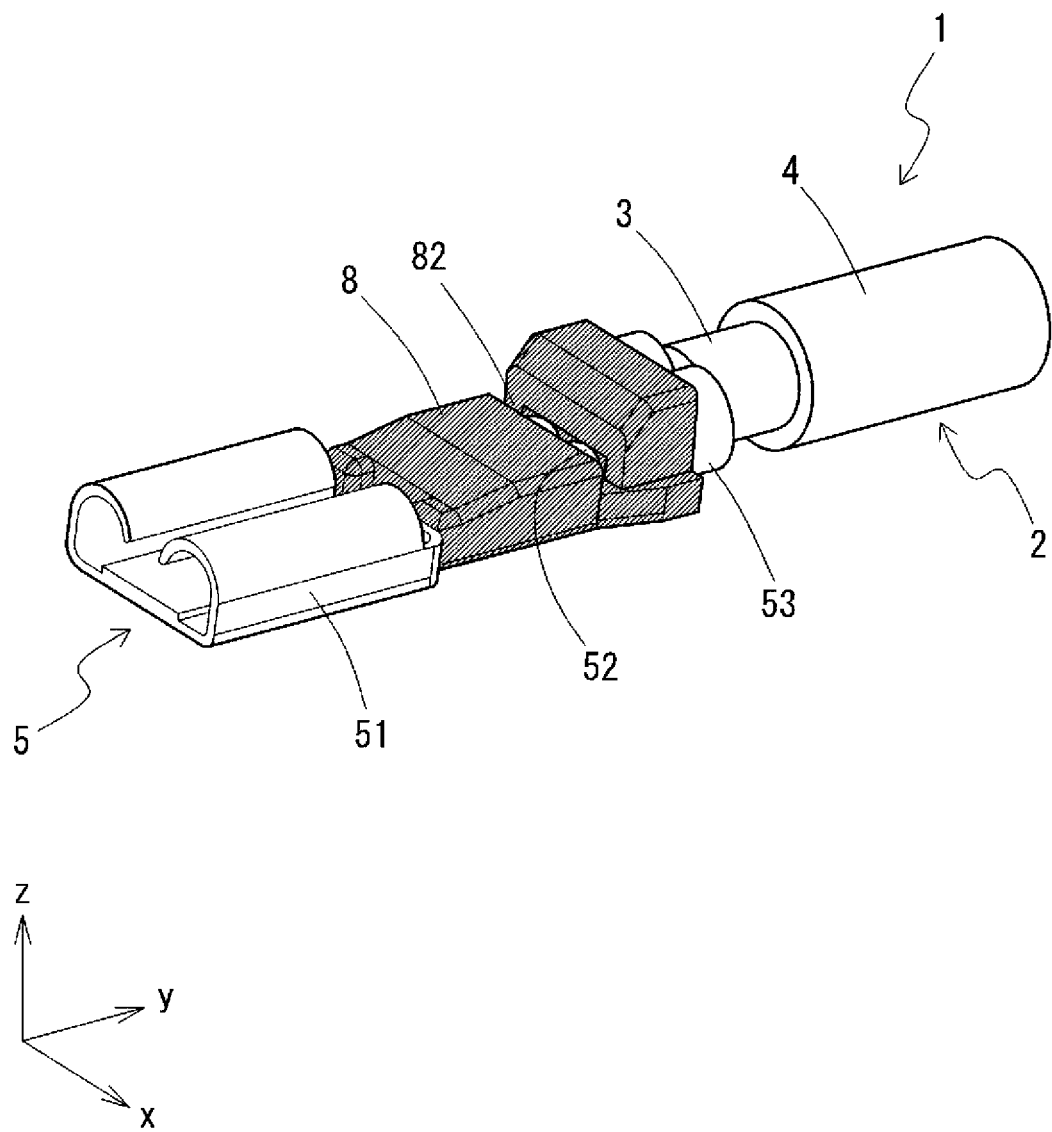
FIG. 4 is a perspective view of the terminal-equipped wire, illustrating a state in which only the first covering layer is formed as a resin covering portion.
Figure 5:
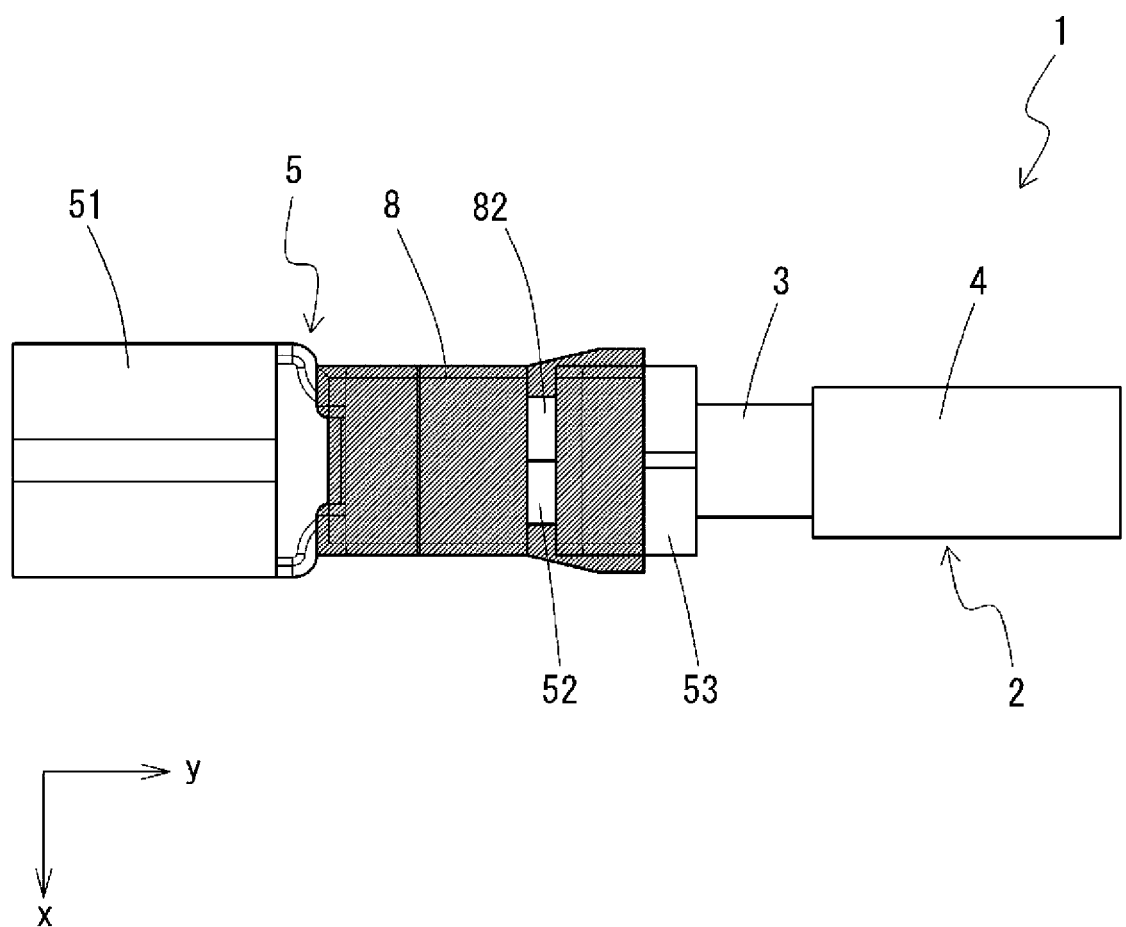
FIG. 5 is a plan view that corresponds to FIG. 4.
Figure 6:
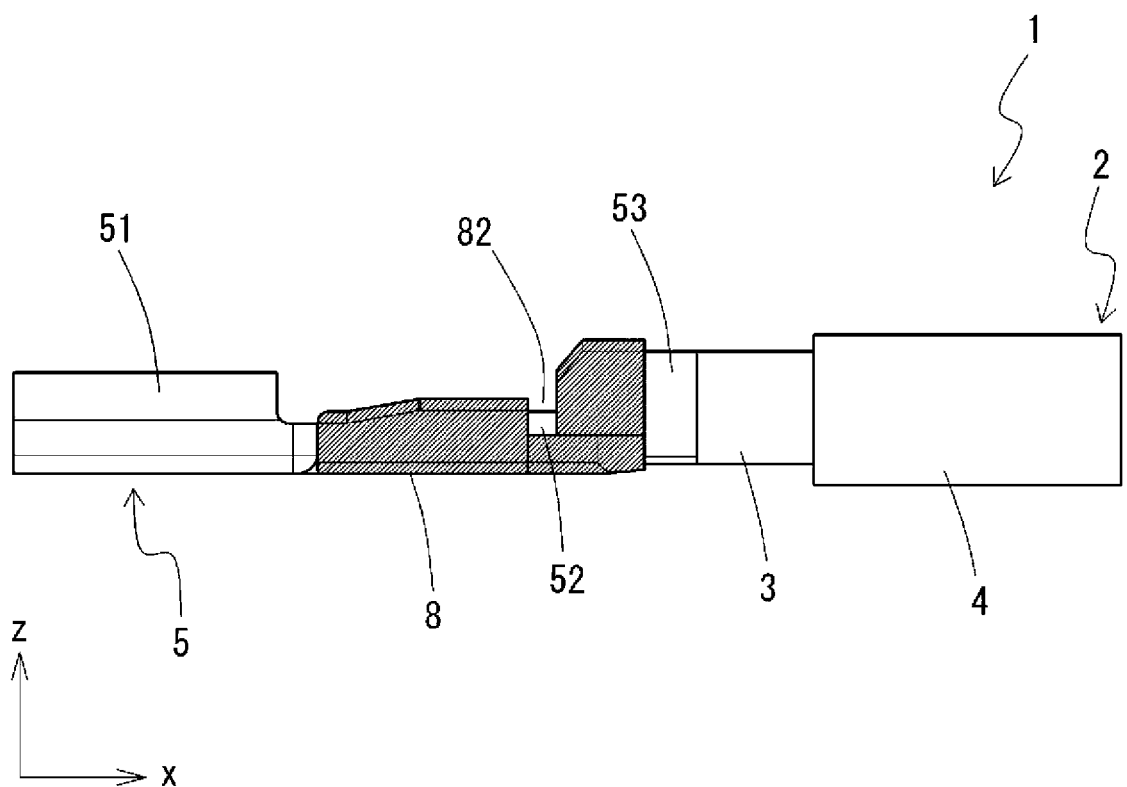
FIG. 6 is a side view that corresponds to FIGS. 4 and 5.

As shown in FIGS. 4 to 6, the first covering layer 8 extends in the longitudinal direction (y direction) while spanning a partial region of the resin covering portion 7 from the front-end portion (end portion on the −y side) of the resin covering portion 7. The first covering layer 8 is directly in contact with a surface of the terminal fitting 5.

Specifically, the first covering layer 8 continuously covers, with respect to the longitudinal direction (y direction), the outer peripheries of the outer terminal fitting 5 and the conductor 3 starting from the position forward (on the −y side) of the exposed conductor 3, which corresponds to the front-end edge of the resin covering portion 7 as a whole, to a halfway position of the second barrel portion 53 of the terminal fitting 5. The first covering layer 8 covers, with respect to the circumferential direction that intersects with the longitudinal direction, the surface of the terminal fitting 5 excluding a bottom surface 5a (surface located in the −z direction; outer surface of the bottom plate portion 52a), that is, the first covering layer 8 covers side surfaces 5b (surfaces located in the ±x directions) and an upper surface 5c (surface located in the +z direction). Note that the resin material reaching from the side surfaces 5b may also adhere to the bottom surface 5a to some extent.

A gap portion 82 (gap) is formed at a halfway position, in the longitudinal direction (y direction), in the region covered by the first covering layer 8. In the gap portion 82, the surface of the terminal fitting 5 is not covered by a first resin material that constitutes the first covering layer 8, and the metal material of the terminal fitting 5 is exposed. Specifically, the gap portion 82 is formed in the shape of a substantially rectangular window at a halfway position, in the longitudinal direction, in the first barrel portion 52 of the terminal fitting 5, and exposes a partial region, in the longitudinal direction (y direction), of the upper surface (surface on the +z side) of the first barrel portion 52 of the terminal fitting 5, the partial region being exposed almost entirely in the width direction (±x directions). As will be described later, the gap portion 82 is formed as a result of, when the first covering layer 8 is formed through molding using a mold, a pin P provided on the mold coming into contact with the terminal fitting 5.

(3-2) Covering Portion of Second Covering Layer

As shown in FIGS. 1 to 3, the second covering layer 9 extends in the longitudinal direction (y direction) while spanning a partial region of the resin covering portion 7 that extends to the rear end portion (end portion on the +y side) of the resin covering portion 7.

Specifically, the second covering layer 9 covers, with respect to the longitudinal direction (y direction), the surfaces of the first covering layer 8, the terminal fitting 5, and the wire 2 starting from a region rearward (on the +y side) of the front-end edge 81 of the first covering layer 8 to the region rearward (on the −y side) of the leading end of the insulating covering 4 of the wire 2, which corresponds to the rear end of the resin covering portion 7 as a whole. In the region in which the first covering layer 8 is formed, the second covering layer 9 is in contact with the surface of the first covering layer 8. On the other hand, in the region in which the first covering layer 8 is not formed, the second covering layer 9 is in contact with the surfaces of the terminal fitting 5 and the conductor 3, and the surface of the insulating covering 4.

With respect to the circumferential direction that intersects with the longitudinal direction, the second covering layer 9 covers, in the front side (−y side) region in which it covers the terminal fitting 5, the entire periphery of the terminal fitting 5 except for the bottom that corresponds to the outer side of the bottom surface 5a, that is, the second covering layer 9 covers the outer sides of the side surfaces 5b and the upper surface 5c, directly or via the first covering layer 8. On the other hand, in the rear side (+y side) region in which the second covering layer 9 covers the insulating covering 4, the second covering layer 9 is formed over the entire circumference of the wire 2.

The second covering layer 9 also covers the surface of the gap portion 82 in which the surface of the terminal fitting 5 is not covered by the first covering layer 8. Here, the state of the second covering layer 9 covering the surface of the gap portion 82 includes a state in which a second resin material that constitutes the second covering layer 9 occludes the gap portion 82. As will be described later, when the first covering layer 8 provided with the gap portion 82 is formed and then the second covering layer 9 is formed through injection molding using the second resin material, the second resin material will not only reach the surface of the gap portion 82 but also fill up the inside thereof, and the second resin material will occlude the gap portion 82. As a result, in the gap portion 82, the second resin material constituting the second covering layer 9 directly comes into contact with the surface of the first barrel portion 52 of the terminal fitting 5 that is not covered by the first covering layer 8. The outer surface of the second covering layer 9 smoothly continues between the portion that corresponds to the gap portion 82 and the surrounding portion thereof.

The portion of the second covering layer 9 that covers the outer periphery of the insulating covering 4 of the wire 2 includes cut-off portions 92 at halfway positions in the longitudinal direction thereof. The cut-off portions 92 are shaped such that the four corners of the second covering layer 9 whose cross section is substantially rectangular are cut off. Each cut-off portion 92 includes, at a position on the inner side in the radial direction of the wire 2, a covering exposed portion 92a, in which the second resin material of the second covering layer 9 is not provided and the insulating covering 4 is exposed. The cut-off portion 92 having such a covering exposed portion 92a is formed, when the second covering layer 9 is formed through injection molding using a mold, by protrusions that protrude inward of the mold and come into contact with the surface of the insulating covering 4 of the wire 2, as will be described later.

A front-end edge 91, which is an end edge located at the front-end portion of the second covering layer 9, serves as a covering end edge that covers the surface of the first covering layer 8, and is provided while covering the surface of the first covering layer 8 over the entire periphery except for a bottom region (a region located in a bottomward direction), that is, the entire regions that correspond to the side surfaces 5b and the upper surface 5c of the terminal fitting 5. In the shown embodiment, the front-end edge 91 of the second covering layer 9 has a shape such that the long side of an almost rectangle that corresponds to the bottom surface 5a side lacks, and a pair of short sides are provided with a long side interposed therebetween. Note that a gap may also be present between the lower end (end portion on the −z side) of the front-end edge 91 of the second covering layer 9 and the bottom surface 5a of the terminal fitting 5, the gap being inevitably formed due to, for example, a manufacturing reason, such as rising of the lower end position of the front-end edge 91 due to mold shrinkage occurring when the second covering layer 9 is manufactured through injection molding (the gap having the height within, for example, 1% of the size in the height direction of the front-end edge 91).

Note that the present embodiment relates to a configuration in which, as described above, the first covering layer 8 includes, at a halfway position in the longitudinal direction thereof, the gap portion 82, which is not covered by the first resin material and exposes the metal material of the terminal fitting 5, but the present disclosure is not limited to such a gap portion 82, and it is sufficient if a recess is provided in the first covering layer 8 and the recess is covered by the second covering layer 9. "Recess" refers to a portion in which the thickness of the first resin material that covers the surface of the metal material of the terminal fitting 5 is thinner than that of the surrounding portion, and if the thickness of the first resin material is zero, the "recess" corresponds to the gap portion 82. Hereinafter, the configurations described for the gap portion 82 are also applicable to a recess in which the surface of the metal material of the terminal fitting 5 is covered by a layer of the first resin material that is thinner than that of the surrounding portion.

(3-3) Constituent Materials of First Covering Layer and Second Covering Layer

The first resin material that constitutes the first covering layer 8 and the second resin material that constitutes the second covering layer 9 are not particularly limited, and a user can appropriately select the materials based on respectively required characteristics such as anticorrosion performances, portions to be covered by the respective covering layers, and the like. The first resin material and the second resin material may be the same or different. However, the first resin material and the second resin material are preferably different because it is possible to independently select the resin materials having suitable physicality based on the portions to be covered by the first covering layer 8 and the second covering layer 9, for example. Note that, when the first resin material and the second resin material are the same, the interface between the first covering layer 8 and the second covering layer 9 can be recognized by the discontinuity of the film structure that may occur due to, for example, a difference in the condition for solidification of the resin materials when the two covering layers 8 and 9 are formed through injection molding.

In view of ensuring the anticorrosive performance of the resin covering portion 7, the first covering layer 8 and the second covering layer 9 preferably have high adhesion to the materials of the layers located below the respective layers. In a case, as described above, where the first covering layer 8 is formed on the front side (−y side) of the resin covering portion 7 while being in contact with the surface of the terminal fitting 5, and the second covering layer 9 is formed at the front-end edge 91 while being in contact with the first covering layer 8 and is formed on the rear side (+y side) of the resin covering portion 7 while being in contact with the insulating covering 4, the higher the adhesion of the first covering layer 8 to the surface of the terminal fitting 5, the adhesion of the second covering layer 9 to the surface of the insulating covering 4, and the adhesion of the second covering layer 9 to the first covering layer 8 are, the more it is preferable. For example, it is preferable that the first covering layer 8 have a higher adhesion (tensile shear adhesion strength) to the terminal fitting 5 than that of the second covering layer 9, and the second covering layer 9 have a higher adhesion to the insulating covering 4 than that of the first covering layer 8.

Specifically, the tensile shear adhesion strength between the metal material that constitutes the terminal fitting 5 and the first covering layer 8, and the tensile shear adhesion strength between the resin material that constitutes the insulating covering 4 and the second covering layer 9 are preferably 1.0 MPa or more. Also, the tensile shear adhesion strength between the first covering layer 8 and the second covering layer 9 is preferably 1.3 MPa or more. Examples of a combination of resin materials that gives such an adhesion strength include a configuration in which the first covering layer 8 is made of a thermoplastic elastomer such as a polyester elastomer, and the second covering layer 9 is made of a polyester resin such as polybutylene terephthalate. Each of the two covering layers 8 and 9 may contain, in addition to a resin material, various types of additive agent.

Method for Manufacturing Terminal-Equipped Wire

Figure 7A:
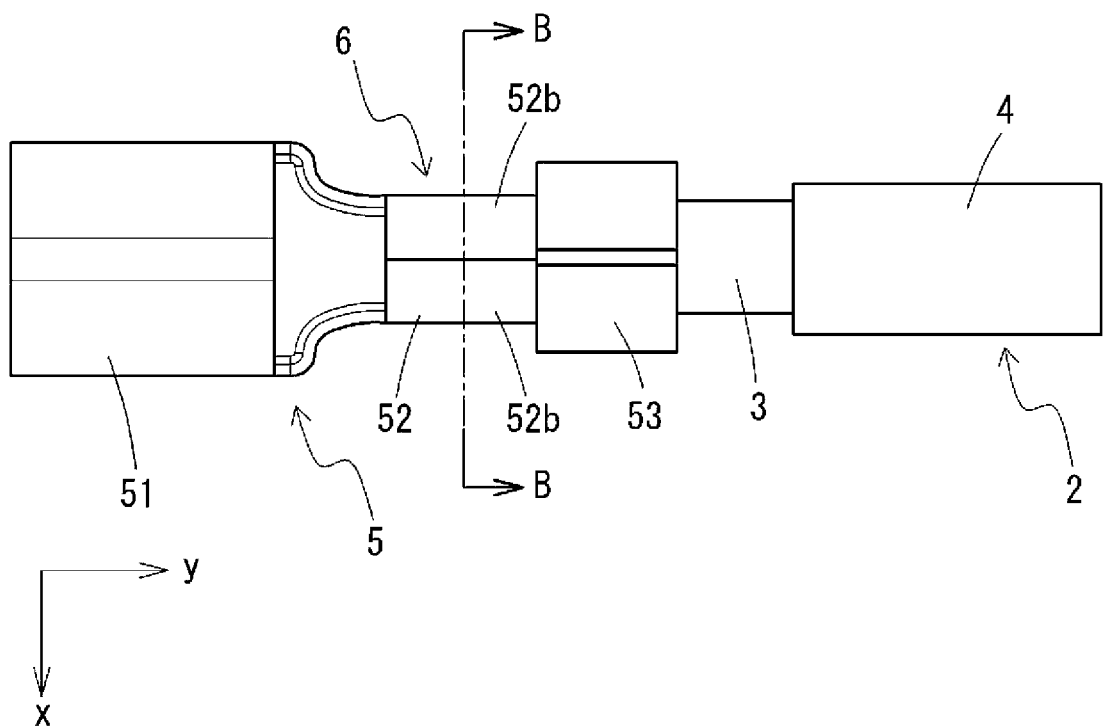
FIGS. 7(a) and 7(b) illustrate a state of the terminal-equipped wire before the resin covering portion is formed, with FIG. 7(a) being a plan view and FIG. 7(b) being a cross-sectional view taken along a line B-B in FIG. 7(a).
Figure 7B:
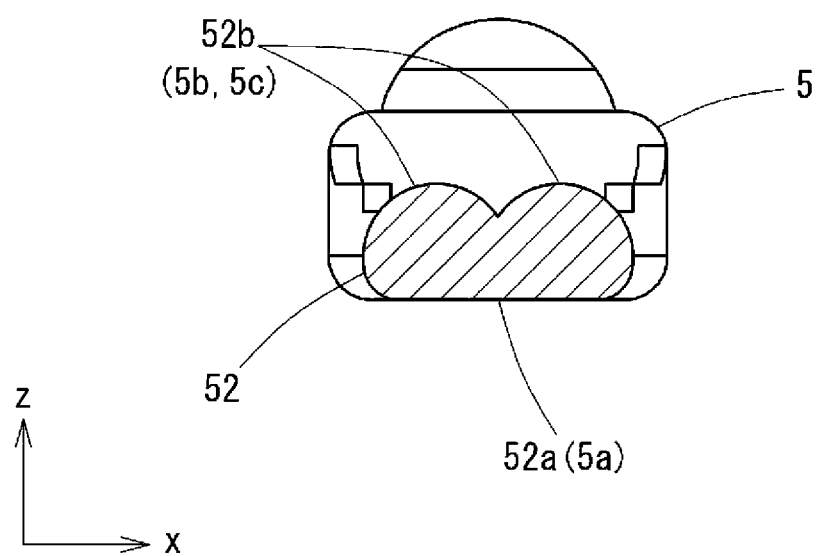

To manufacture the terminal-equipped wire 1 as described above, first, the terminal fitting 5 is connected to an end of the wire 2, and a connection structure that includes the electric connection portion 6 as shown in FIG. 7 is manufactured. The insulating covering 4 is removed in advance at an end portion of the wire 2 so that the conductor 3 is exposed, and the exposed portion of the conductor 3 is placed on the upper surface of the bottom plate surface 52*a* of the terminal fitting 5. The front side of the conductor 3 is crimped and fixed to the first barrel portion 52, and the rear side of the conductor 3 is crimped and fixed to the second barrel portion 53.

Then, the first covering layer 8 and the second covering layer 9 are sequentially formed on the surface of the electric connection portion 6. The two covering layers 8 and 9 can be formed through injection molding using molds.

Figure 8:
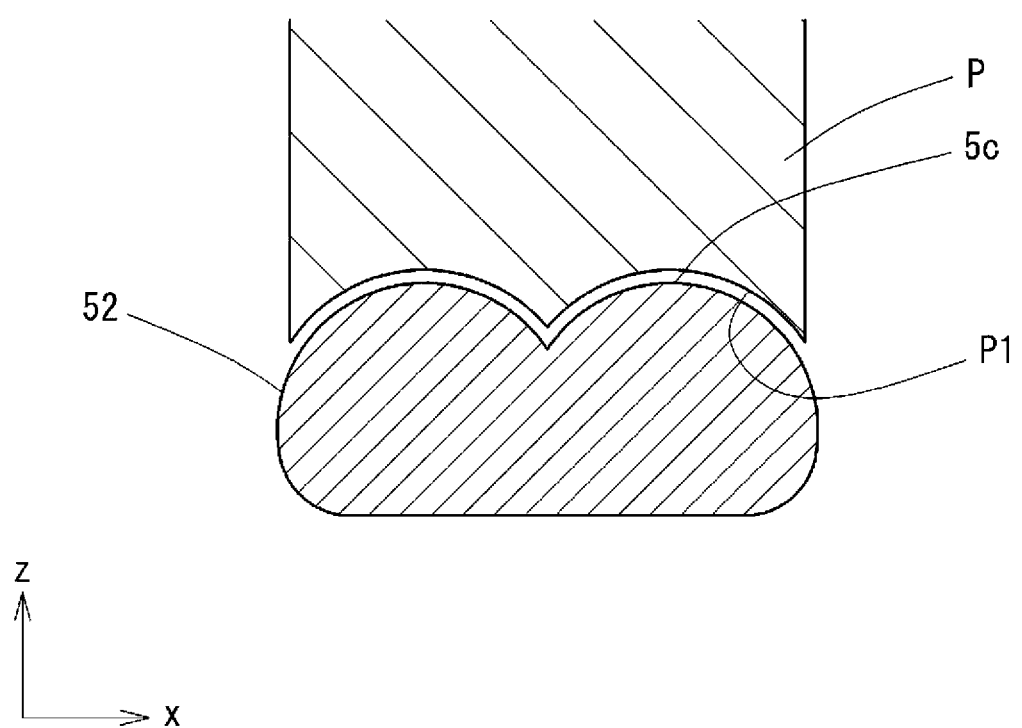
FIG. 8 is a cross-sectional view that corresponds to FIG. 7(b), illustrating positioning of the terminal fitting using a positioning member when the first covering layer is formed.

The pin P, serving as a positioning member, is provided inside of the mold that is used when the first covering layer 8 is formed. The mold includes an upper mold and a lower mold, and the pin P protrudes from the upper surface of the upper mold to the lower side. As shown in FIG. 8, the pin P has a shape and size such that it extends in the direction that corresponds to the width direction (x direction) of the terminal fitting 5, and can come into contact with the first barrel portion 52 while conforming to the shape of the upper surface (outer surfaces of the first crimping pieces 52*b*) of the first barrel portion 52 of the terminal fitting 5 to which the conductor 3 is crimped and fixed. Specifically, as shown in FIGS. 7(*b*) and 8, the pair of first crimping pieces 52*b* of the first barrel portion 52 enclose, from both sides in the width direction, the outer periphery of the conductor 3 placed on the bottom plate surface 52*a* of the terminal fitting 5, and the upper surface (outer surface on the +z side) of the first barrel portion 52 is curved while bulging toward the center from both sides in the width direction (x direction) with the substantially central portion depressed. Also, a lower surface P1 of the pin P provided on the mold has a shape that conforms to the curve shape of the upper surface of the first barrel portion 52.

The terminal fitting 5 to which the wire 2 is fixed is placed at a predetermined position on the lower mold, and the upper mold is placed so that the pin P is located at a predetermined halfway position of the first barrel portion 52 of the terminal fitting 5. Thus, the pin P is brought into contact with the upper surface of the first barrel portion 52 while conforming to the curve shape. Then, the pin P presses the terminal fitting 5 against the lower mold, and the terminal fitting 5 is positioned with respect to the upper mold and the lower mold in the width direction (x direction) and the height direction (z direction). Since the lower surface P1 of the pin P has the shape that conforms to the upper surface of the first barrel portion 52, even if the terminal fitting 5 is misaligned when the terminal fitting 5 is placed on the lower mold, the misalignment will be corrected when the upper mold is placed. In a state in which the terminal fitting 5 is positioned between the upper mold and the lower mold, a gap that can be filled with a resin material with a predetermined thickness is provided between inner wall surface of the mold, and the surface of the terminal fitting 5 except for the bottom surface 5*a*, excluding the portion in which the pin P is in contact with the first barrel portion 52 of the terminal fitting 5.

In this state, the first resin material for the first covering layer 8 is poured into the cavity of the molds so as to flow thereinto, and then is solidified. Accordingly, the state, as shown in FIGS. 4 to 6, in which the first covering layer 8 covers a predetermined position on the surface of the terminal fitting 5 can be obtained. The first resin material is not placed in the portion in which the pin P of the mold is in contact with the upper surface of the first barrel portion 52 of the terminal fitting 5, so that the gap portion 82 is formed therein.

The terminal-equipped wire in which the first covering layer 8 has been formed in this manner is further subjected to injection molding using another mold, so that the second covering layer 9 is formed. At this time, the mold is provided with the protrusions that protrude to the inner side at the positions that correspond to the positions of the conductor 3 of the terminal-equipped wire 1 that are covered by the insulating covering 4, in such a manner that the tips of the protrusions come into contact with the outer periphery of the insulating covering 4. Furthermore, it is designed that, in the electric connection portion 6, the bottom surface 5*a* of the terminal fitting 5 comes into contact with the inner wall surface of the mold, so that no gap that a resin material can enter is formed between the bottom surface 5*a* of the terminal fitting 5 and the mold. The gap is provided between the terminal-equipped wire 1 and the mold, excluding the bottom surface 5*a* of the terminal fitting 5 and the portions of the mold that correspond to the positions at which the protrusions are provided, the gap being able to be filled with a resin material with a predetermined thickness.

In this state, the second resin material for the second covering layer 9 is poured into the cavity of the molds so as to flow thereinto, and then is solidified. Accordingly, the state, as shown in FIGS. 1 to 3, in which the second covering layer 9 covers predetermined positions on the surfaces of the first covering layer 8, the terminal fitting 5, and the wire 2 can be obtained. The cut-off portions 92 having the covering exposed portions 92*a* are formed at the positions at which the protrusions of the mold are in contact with the insulating covering 4 of the wire 2.

Characteristics of Terminal-Equipped Wire (1) Regarding Lamination Structure of Resin Covering Portion and Configuration of Gap Portion In the terminal-equipped wire 1 according to the present embodiment, the resin covering portion 7 is constituted by two layers, namely, the first covering layer 8 and the second covering layer 9, and the gap portion 82, which is formed at a halfway position in the longitudinal direction of the first covering layer 8, is covered by the second covering layer 9. Accordingly, the electric connection portion 6 that electrically connect the wire conductor 3 to the terminal fitting 5 is covered by the resin materials over its entire region in the longitudinal direction.

As described above, the gap portion 82 is formed as a result of, when the first covering layer 8 is formed through injection molding, the pin P serving as the positioning member provided on the mold being in contact with the surface of the first barrel portion 52 of the terminal fitting 5. When, in the state in which the terminal fitting 5 is positioned with respect to the mold using the pin P in this manner, the first resin material is poured into the mold and the first covering layer 8 is formed, the formation of the first covering layer 8 with high positional accuracy can be realized. Even if the resin material to be poured has a high flowability or injection pressure is high, the positioning effect using the pin P can suppress shifting of the terminal fitting 5 within the mold that may be caused by a collision of the resin materials. As a result, it is possible to accurately form the first covering layer 8 with a predetermined thickness at a predetermined position on the surface of the terminal fitting 5, and thus even if a thin first covering layer 8 is formed, such a situation that the surface of the terminal fitting 5 is exposed from the first covering layer 8 at an unintended position is not likely to occur. Accordingly, the first covering layer 8 can be set to be thin.

When the positioning member such as the pin P is used to form a thin first covering layer 8 in this manner, even if the presence of this positioning member creates a portion such as the gap portion 82 that is not covered by the first covering layer 8, by covering that portion with the second covering layer 9, it is possible to form a continuous film of the resin covering portion 7 as a whole without the terminal fitting 5 or the conductor 3 being exposed. As a result, it is possible to suppress a corrosion factor such as salt water from entering the electric connection portion 6 from a portion such as the gap portion 82 that is not covered by the first covering layer 8, and causing corrosion such as dissimilar metal corrosion.

By performing positioning using the positioning member such as the pin P for creating the gap portion 82 and forming a thin first covering layer 8, it is possible to reduce the thickness of the resin material of the resin covering portion 7 as a whole that includes the second covering layer 9. As a result, the electric connection portion 6 of the terminal-equipped wire 1 that is covered by the resin covering portion 7 can be downsized, and the terminal fitting 5 including the electric connection portion 6 can also be housed in a small connector housing.

Note that the present disclosure is not limited to the gap portion 82 formed in the resin covering layer 7 as described above, and it is sufficient that a recess in which the layer of the first resin material is thinner than that of the surrounding portion is formed in the first covering layer 8, and is covered by the second covering layer 9. A recess in which the surface of the terminal fitting 5 is covered by the first resin material layer that is thinner than that of the surrounding portion can be formed by, for example, when the first resin material is formed through injection molding, the first resin material reaching the position at which the first barrel portion 52 is in contact with the pin P of the mold from the surround portion. Furthermore, also when the pin P is close to the first barrel portion 52 without being in contact therewith, the pin P can exert positioning effect with respect to the terminal fitting 5 to some extent. In this case, the first resin material supplied into a narrow gap between the pin P and the first barrel portion 52 that are close to each other forms a thin layer, and constitutes a recess. In view of sufficiently achieving the positioning effects with respect to the terminal fitting 5, the thickness of the first resin material in the recess is preferably small, that is, the thickness takes 10% of the thickness of the portion adjacent to the recess, or less, for example. By covering, with the second covering layer 9, the recess in which the layer of the first resin material is thinner than that of the surrounding portion, it is possible to suppress a corrosion factor from entering from the recess and causing corrosion, due to the thickness of the first resin material.

A user can select a suitable thickness of the resin covering portion 7 based on the required anticorrosive performance, the size of a connector housing to be used, and the like. For example, if the thickness of the resin covering portion 7 as a whole is set to 0.1 mm or more, it will be easy to ensure sufficient anticorrosive performance while preventing exposure of the electric connection portion 6, even under the effect of a manufacturing error or the like. On the other hand, if the thickness of the resin covering portion 7 as a whole is set to 0.2 mm or less, it will be easy to sufficiently downsize the electric connection portion 6 covered by the resin covering portion 7. Furthermore, a resin material that is highly adhesive to a metal material and is suitable to be used as the first covering layer 8 often has high flowability, and is suitable for thin-wall molding, and particularly by forming a thin first covering layer 8, it is easy to reduce the thickness of the entire resin covering portion 7. Examples of the thickness ratio of the first covering layer 8 to the second covering layer 9 (the first covering layer: the second covering layer) can include the range from 1:1 to 1:2. Furthermore, a layer made of another resin material may also be provided between the first covering layer 8 and the second covering layer 9, or on the outside of the second covering layer 9, as long as the entirety of the gap portion 82 formed at a halfway position of the first covering layer 8 provided in contact with the surface of the terminal fitting 5 is covered by the second covering layer 9 provided on the outer side of the first covering layer 8. Note however that, in view of suppressing the thickness of the resin covering portion 7, the resin covering portion 7 is preferably constituted only by the first covering layer 8 and the second covering layer 9.

The positions and number of gap portions 82 of the first covering layer 8 are not particularly limited. In the above-described terminal-equipped wire 1, the gap portion 82 is provided at the position at which the first barrel portion 52 is covered by the first covering layer 8 on the assumption that the pin P is used to position the terminal fitting 5 on the first barrel portion 52. By performing positioning using the pin P at the position that corresponds to the barrel portion such as the first barrel portion 52, it is possible to realize accurate positioning when the first covering layer 8 is formed. Typically, in the terminal-equipped wire 1, the barrel portion including the first barrel portion 52 has a smaller manufacturing tolerance than other portions of the region to be covered by the first covering layer 8, in view of management of electrical connection between the terminal fitting 5 and the conductor 3 of the wire 2 for example, since, in a state in which the wire 2 is connected to the terminal fitting 5 as shown in FIG. 7, the barrel portion serves as a portion that connects the wire 2 and the terminal fitting 5, which are separate members. Accordingly, by performing positioning while pressing, using the pin P, the position that has a small manufacturing tolerance and has the shape and size that are accurately managed, it is possible to realize high accurate positioning compared to a case where positioning is performed in other portions, and the first covering layer 8 can accurately be formed at a position on the surface of the terminal fitting 5 including the electric connection portion 6 at which corrosion prevention is required.

Of the barrel portion, particularly the first barrel portion 52 to which the conductor 3 is connected has a small manufacturing tolerance, and when the pin P is fixed to the position that corresponds to the first barrel portion 52, the first covering layer 8 can be formed particularly accurately. Furthermore, the upper surface of the first barrel portion 52 is curved while bulging toward the center from both sides in the width direction with the substantially central portion depressed. As a result of the pin P that conforms to this curve shape coming into contact with the first barrel portion 52, it is easy to prevent the terminal fitting 5 from shifting in the x direction and the z direction even when a flowable resin material collides with the terminal fitting 5. Also, the first barrel portion 52 is located at an intermediate position in the longitudinal direction of the region to be covered by the first covering layer 8, and by pressing the position with the pin P, it is possible to efficiently position the terminal fitting 5 as a whole even using only the pin P located at one position. By suppressing the number of gap portion 82 to one, the anticorrosion performance of the resin covering portion 7 is likely to be maintained to be high.

Note that, if the first covering layer 8 is accurately formed and covers the surface of the terminal fitting 5 that needs to be covered without exposing it, the positioning accuracy required when the second covering layer 9 is molded is not necessarily as high as that when the first covering layer 8 is molded. Accordingly, when the second covering layer 9 is formed, even without using a member such as the pin P that positions the terminal-equipped wire 1 at the position of the terminal fitting 5, the thickness of the second covering layer 9 can be reduced. If positioning is performed at a position on the rear side of the terminal fitting 5 at which the conductor 3 is covered by the insulating covering 4, the second covering layer 9 can be formed sufficiently accurately. As described above, the cut-off portions 92 that include the covering exposed portions 92a are formed by the protrusions provided on the mold for such positioning. The cut-off portions 92 also have the effect that, when the force in the direction of bending the wire 2 is exerted in the manufactured terminal-equipped wire 1, the resin covering portion 7 is likely to follow the bending.

The present disclosure is not particularly limited to any specific arrangement and shapes of the first covering layer 8 and the second covering layer 9, as long as the first covering layer 8 is provided in a region that covers at least part of the terminal fitting 5, and has the gap portion 82 at a halfway position in the longitudinal direction, and the second covering layer 9 covers at least part of the first covering layer 8 that includes the position at which the gap portion 82 is provided. In the terminal-equipped wire 1 according to the present embodiment, the second covering layer 9 does not cover the region that corresponds to the bottom surface 5a of the terminal fitting 5, and the first covering layer 8 is also not formed on the bottom surface 5a of the terminal fitting 5, excluding films formed of the first resin material reaching from the side surfaces 5b. As described above, as a result of, in at least the portion that covers the terminal fitting 5, the outer side of the bottom surface 5a includes no resin layer or a thin resin layer, the distance between the bottom surface 5a of the terminal fitting 5 and the inner wall surface of the connector housing can be reduced when the terminal fitting 5 is inserted into the connector housing, making a user easy to insert the terminal fitting 5 into the connector housing. Furthermore, it is easy to ensure a margin for forming a thick resin layer on the upper side (+x side) of the electric connection portion 6, for which it is essential to achieve high anticorrosive performance. However, if, for example, the margin between the connector housing and the terminal fitting 5 is relatively large, or it is also desirable to add anticorrosion performance to the bottom surface 5a of the terminal fitting 5, a configuration is also possible in which the first covering layer 8 and the second covering layer 9 are also provided in the bottomward direction.

(2) Regarding Front-End Edge of Second Covering Layer

As described above, the second covering layer 9 may have any shape as long as it covers at least part of the first covering layer 8 that includes the portion in which the gap portion 82 is provided, but the front-end edge 91 of the second covering layer 9 is preferably formed as a covering end edge that covers the first covering layer 8 over the entire periphery except for a bottom region, as described for the terminal-equipped wire 1 according to the present embodiment. In other words, it is preferable that, in a cross section (x-z plane) that passes the frontmost portion of the second covering layer 9 and intersects with the longitudinal direction of the terminal-equipped wire 1, the end edge of the second covering layer 9 be formed over the entire periphery except for a bottom region while covering the first covering layer 8, and it is preferable that, as exemplified in FIG. 9, the periphery except for a bottom region does not include a retracted end edge 91b that is retracted rearward (in the +y direction), the retracted end edge 91b being not included in the cross section (x-z plane) that passes the frontmost portion of the second covering layer 9 and intersects with the longitudinal direction of the terminal-equipped wire 1.

As a result of the front-end edge 91 of the second covering layer 9 being provided as a covering end edge that covers the first covering layer 8 over a wide region, namely, the entire periphery except for a bottom region, it is possible to suppress the second covering layer 9 from disengaging from the first covering layer 8. As a result, such a situation is not likely to occur that, due to disengagement of the second covering layer 9, a corrosion factor enters a space between the first covering layer 8 and the second covering layer 9, and the anticorrosive performance of the resin covering portion 7 is impaired. Also, because the adhesion between the first covering layer 8 and the second covering layer 9 is strong, the first covering layer 8 and the second covering layer 9 are not likely to disengage from each other even upon application of a force of pulling the wire 2 out of the terminal fitting 5 covered by the resin covering portion 7, and it is easy for the first covering layer 8 and the second covering layer 9 to withstand a pull-out force involving disengagement of the two covering layers.

Figure 9:
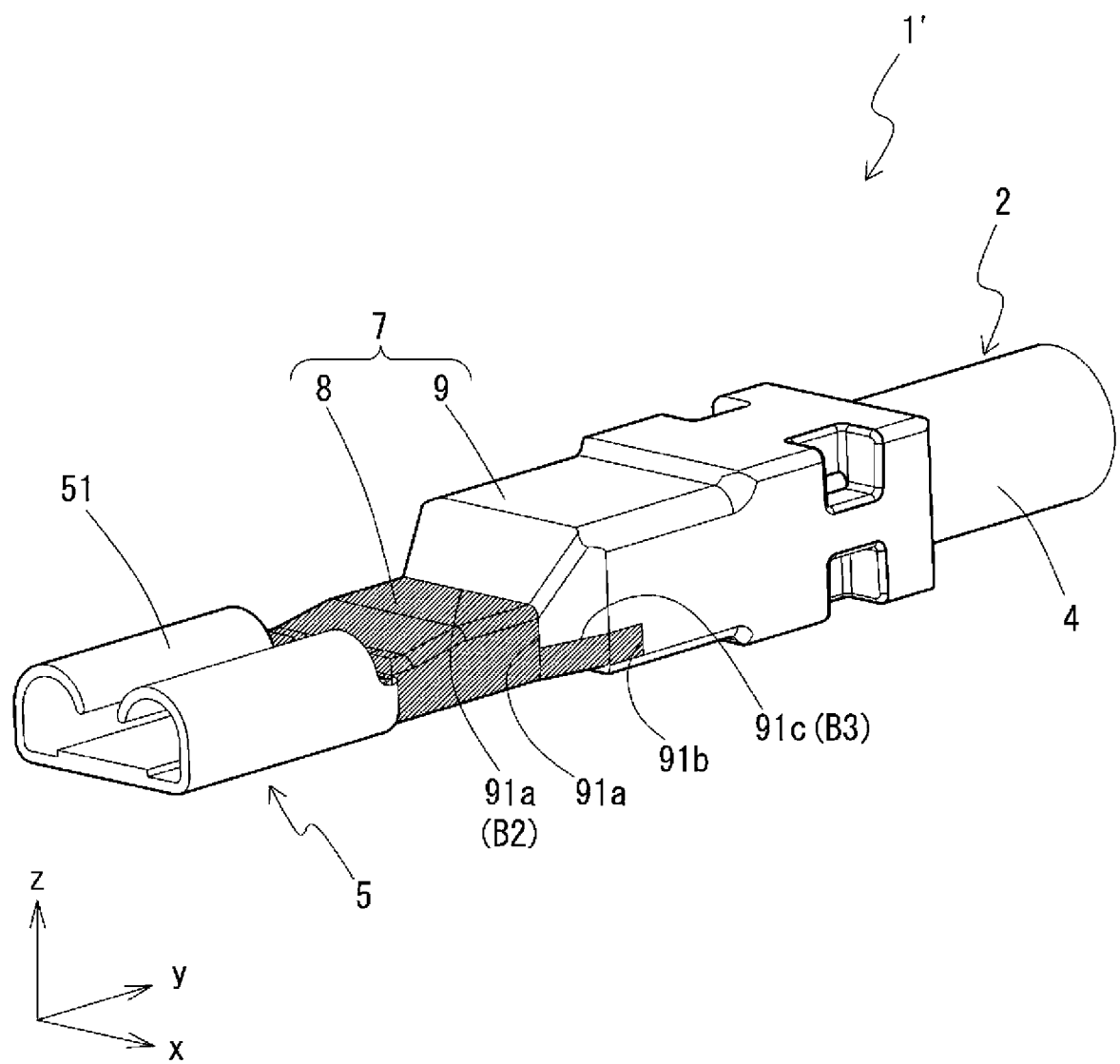
FIG. 9 is a perspective view illustrating a terminal-equipped wire according to another embodiment of the present disclosure, in which a front-end edge of a second covering layer is not provided over the entire periphery of a terminal fitting except for a bottom surface.

In a case where the second covering layer 9 is formed on the outer side of the first covering layer 8 through injection molding, mold shrinkage is likely to occur, when the second resin material in a state of being flowable is poured into the mold, and then the second resin material is solidified. If the front-end edge 91a of the second covering layer 9 is provided over the entire periphery except for a bottom region as shown in FIGS. 1 to 3, mold shrinkage will occur in the front-end edge 91 in a direction of pressing against the first covering layer 8, that is, in a direction in which the second covering layer 9 presses the first covering layer 8 against the terminal fitting 5, which will be described with reference to a later-described working example. Due to the shrinkage in the pressing direction, the adhesion of the second covering layer 9 to the first covering layer 8 will be enhanced. In contrast, if, as shown in FIG. 9, the front-end edge 91a of the second covering layer 9 is not provided over the entire periphery except for a bottom region, and the retracted end edge 91b is provided, mold shrinkage will be likely to occur in the front-end edge 91a and longitudinal end edges 91c, which are end edges extending in the longitudinal direction (y direction) and connecting the front-end edge 91a and the retracted end edge 91b, in a direction of disengaging from the first covering layer 8, that is, the direction in which the second covering layer 9 separates away from the surface of the first covering layer 8. Due to the shrinkage occurring in the disengaging direction, the adhesion of the second covering layer 9 to the first covering layer 8 will be reduced. The following will describe the reason why there is such a difference in the shrinkage direction depending on the shape of the front-end edge 91 of the second covering layer 9.

Typically, mold shrinkage of a resin material occurs toward a portion in which a material is thick. In a region in the vicinity of the front-end edge 91, 91*a* of the second covering layer 9 of the terminal-equipped wire 1, 1' as shown in FIGS. 1 to 3 and 9, such mold shrinkage occurs rearward (+y direction) in the longitudinal direction. On the other hand, in the case of a resin material molded into the shape of a tube, mold shrinkage occurs inward of the tube so as to shrink the tubular shape. Therefore, when, as in a case of the terminal-equipped wire 1 shown in FIGS. 1 to 3 where the front-end edge 91 of the second covering layer 9 covers the entire periphery except for a bottom region of the terminal fitting 5, the front-end edge 91 of the second covering layer 9 and a portion in the vicinity thereof have the shape of a substantially rectangular tube, shrinkage that occurs to the inner side of the rectangular tube will largely be affected, and mold shrinkage will be likely to occur in the front-end edge 91 of the second covering layer 9 in a direction of pressing against the lower first covering layer 8. On the other hand, when, as in the terminal-equipped wire 1' shown in FIG. 9 where the front-end edge 91*a* of the second covering layer 9 only covers the region in the upper direction (+z direction) and partial regions in the width direction (±x directions), the front-end edge 91*a* of the second covering layer 9 and a portion in the vicinity thereof have a shape different from a rectangular tube, shrinkage that occurs rearward (+y direction) in the longitudinal direction, that is, toward a portion in which the material is thick will largely be affected, and mold shrinkage will be likely to occur in the front-end edge 91*a*, the retracted end edge 91*b*, and longitudinal end edge 91*c* of the second covering layer 9, in a direction of disengaging from the lower first covering layer 8.

Thus, the front-end edge 91 of the second covering layer 9 is preferably provided, as shown in FIGS. 1 to 3, as a covering end edge that covers the first covering layer 8, at least over the entire periphery except for a bottom region. In the shown embodiment, the terminal fitting 5 includes the flat bottom plate surface 52*a*, and the portion on the front side of the first covering layer 8 that is covered by the second covering layer 9 is formed as a region in the shape of a substantially cuboid block. Therefore, the term "the entire periphery except for a bottom region" regarding the shape of the front-end edge 91 of the second covering layer 9 refers to the entire region of three sides, out of four sides of an almost rectangle, except for one long side on the bottom surface 5*a* side (−z side) of the terminal fitting 5. However, even if, for example, the terminal fitting 5 does not include the flat bottom plate surface 52*a*, or the corresponding portion of the first covering layer 8 does not have a substantially cuboid shape, it is sufficient that the front-end edge 91 of the second covering layer 9 is provided covering at least the outer surface of the first covering layer 8 that faces all the directions except for the bottomward direction (typically, a direction in which a normal is directed at within ±20° with respect to the −z direction), which is directed opposite to the side on which the conductor 3 is arranged on the terminal fitting 5.

If the front-end edge 91 of the second covering layer 9 that serves as a covering end edge is provided at least over the entire periphery except for a bottom region, it is possible, as described above, to enjoy the effect of suppressing the second covering layer 9 from disengaging from the first covering layer 8, compared to a case where the front-end edge 91 is not provided over the entire periphery except for a bottom region. With respect to the bottom region, it is not essential whether or not the front-end edge 91, serving as a covering end edge, of the second covering layer 9 that covers the first covering layer 8 is provided. If the front-end edge 91, 91*a*, serving as a covering end edge, of the second covering layer 9 is not provided in a bottom region, as shown in FIGS. 1 to 3 and 9, in view of, for example, reducing the distance between the bottom surface 5*a* of the terminal fitting 5 and the connector housing, it will be noticeable that mold shrinkage of the second covering layer 9 in the disengaging direction occurs in the front-end edge 91*a* serving as a covering end edge, which is not provided over the entire periphery except for the bottom surface 5*a* as shown in FIG. 9, and thus the effect of suppressing disengagement that is brought about due to the fact that, as shown in FIGS. 1 to 3, the front-end edge 91 serving as a covering end edge is provided over the entire periphery except for the bottom surface 5*a* is relatively large.

On the other hand, if the first covering layer 8 and the second covering layer 9 are formed also on the bottom surface 5*a* of the terminal fitting 5 in view of, for example, enhancing the anticorrosion performance, the front-end edge 91 of the second covering layer 9 will be approximate to a tubular shape, compared to the case where these covering layers 8 and 9 are not formed on the bottom surface 5*a* as shown in FIGS. 1 to 3 and 9, and thus in the front-end edge 91 of the second covering layer 9, mold shrinkage is likely to occur not in the disengaging direction but in the pressing direction. In this case, there is a small difference in the direction and extent of mold shrinkage that depends on whether or not the front-end edge 91 of the second covering layer 9 serving as a covering end edge is provided over the entire periphery except for a bottom region.

Furthermore, the higher the uniformity over the entire periphery except for a bottom region the thickness of the second covering layer 9 at the position of the front-end edge 91 serving as a covering end edge has, the more the mold shrinkage in the pressing direction is more likely to occur in all the directions. Moreover, the smaller the area of a region enclosed by the front-end edge 91 is, the more the mold shrinkage in the pressing direction is likely to occur. For example, it is preferable that the upper side (a side A2 in FIG. 1) of the front-end edge 91 be located on the lower side (−z side) of the central position, in the height direction (z direction), of the entire second covering layer 9. An amount of mold shrinkage of the front-end edge 91 in the pressing direction, that is, an amount of deformation of the front-end edge 91 toward the first covering layer 8 from a reference position is preferably large, the reference position being a position on the surface of the second covering layer 9 that is located rearward of the front-end edge 91. For example, a configuration in which the amount is 10% or greater of the thickness of the second covering layer 9 in the front-end edge 91 can be taken as an example. The amount and direction of the mold shrinkage may vary depending on, in addition to the specific shape of the second covering layer 9 including the front-end edge 91 as described above, the material of the second covering layer 9, and conditions during injection molding (such as a resin material, the temperature of the mold, and an injection pressure).

The direction and extent of the mold shrinkage occurring at the front-end edge 91 of the second covering layer 9 can be estimated using a computer simulation with resin flow analysis, as in the later-described working example. Alternatively, the direction and extent of the mold shrinkage can be actually measured through microscope observation or the like. It is preferable that mold shrinkage in the pressing direction occur in the entire region of the front-end edge 91 of the second covering layer 9, but it is sufficient if, as in the later-described working example, it can be confirmed that mold shrinkage in the pressing direction is occurring at at least three positions on the front-end edge 91 that are apart away from each other.

If, as the embodiment shown in FIGS. 1 to 3, the front-end edge 91 of the second covering layer 9 serves as a covering end edge that covers the first covering layer 8 at least over the entire periphery except for a bottom region, the effect of suppressing the second covering layer 9 from disengaging can be obtained irrespective of whether the surface of the first covering layer 8 is exposed to the forward side (−y side) of the front-end edge 91 of the second covering layer 9, or the position of the front-end edge 81 of the first covering layer 8 substantially match the position of the front-end edge 91 of the second covering layer 9. Also, in the embodiment shown in FIGS. 1 to 3, a configuration is not conceivable in which the second covering layer 9 is provided extending to the rearward side (+y side) of the first covering layer 8, and the rear end edge of the second covering layer 9 covers the first covering layer 8, but if the first covering layer 8 is provided extending to the rearward side of the rear end edge of the second covering layer 9, or to the position that substantially matches the rear end edge of the second covering layer 9, the effect of suppressing the second covering layer 9 from disengaging can be obtained, by providing also the rear end edge of the second covering layer 9 that serves as a covering end edge that covers the first covering layer 8 over the entire periphery except for a bottom region.

[Wire Harness]

A wire harness according to an embodiment of the present disclosure includes a plurality of wires including the terminal-equipped wire 1 (1') according to the embodiment described above. All of the wires included in the wire harness may be the terminal-equipped wires 1 (1') according to the embodiment described above, or only some of the wires included in the wire harness may be the terminal-equipped wires 1 (1') according to the embodiment described above.

Figure 11:
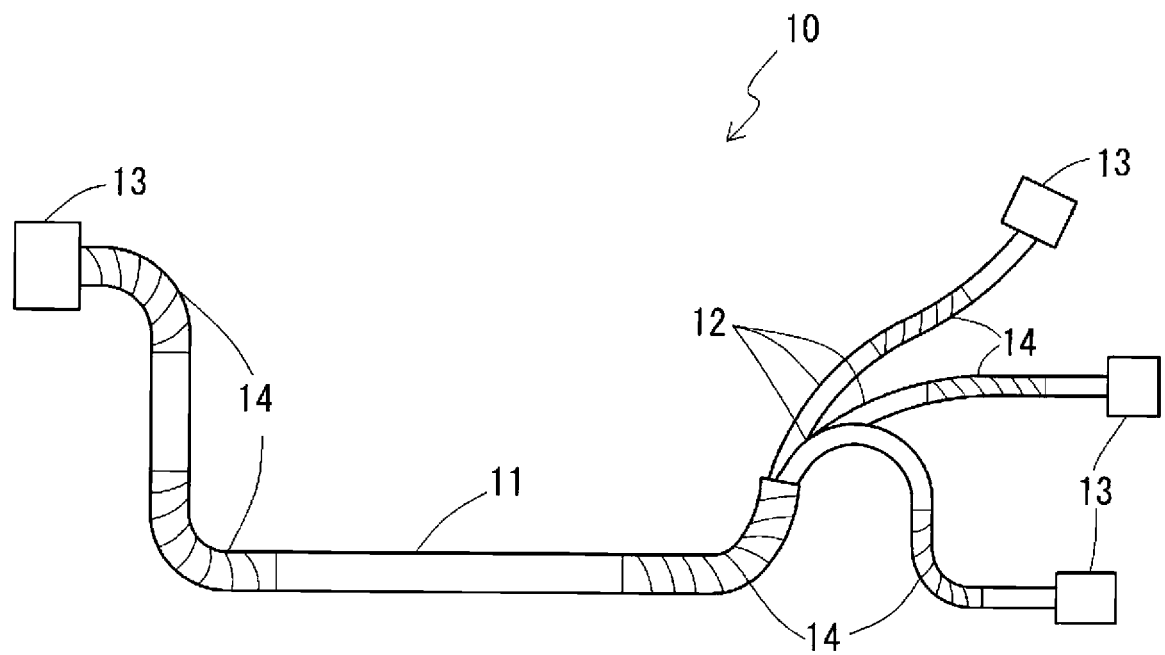
FIG. 11 is a side view illustrating a wire harness according to an embodiment of the present disclosure.

FIG. 11 shows an example of the wire harness. A wire harness 10 includes a main harness portion 11 and three branch harness portions 12 branched from a distal end of the main harness portion 11. A plurality of terminal-equipped wires are bundled together at the main harness portion 11. The terminal-equipped wires are divided into three groups, which are respectively bundled at the branch harness portions 12. The terminal-equipped wires are bundled and bent at the main harness portion 11 and the branch harness portions 12 using adhesive tape 14. A proximal end of the main harness portion 11 and distal ends of the branch harness portions 12 are each provided with a connector 13. The connectors 13 house terminal fittings attached to the ends of the terminal-equipped wires.

At least one of the terminal-equipped wires included in the wire harness 10 is the terminal-equipped wire 1 (1') according to the embodiment described above. The terminal fitting 5 and the electric connection portion 6 covered by the resin covering portion 7 of the terminal-equipped wire 1 (1') are housed in the connector housing, and constitute the connector 13.

Working Example

Hereinafter, a working example of the present disclosure is presented. Note that the present disclosure is not limited to the working example below.

Testing Method

A computer simulation was performed to test the influence of the shape of the front-end edge of the second covering layer on mold shrinkage. For the simulation, a resin flow analysis according to a finite element method (software: Autodesk Moldflow Insight) was used.

Specifically, a resin layer that has the shape of the second covering layer shown in FIGS. 1 to 3 was employed as a model 1. Here, the front-end edge of the resin layer was provided over the entire periphery except for a bottom region. The thickness of the resin layer at the front-end edge was set to 0.4 mm.

On the other hand, a resin layer that has the shape of the second covering layer shown in FIG. 9 was employed as a model 2. Here, the front-end edge of the resin layer was provided over the entire region in its upper surface region, and only partial regions on the upper side in its side surface regions. The thickness of the resin layer at the front-end edge, the retracted end edge, and the longitudinal end edge was set to 0.5 mm.

In the simulation, various parameters of the physicality of the resin were set while taking into consideration a case where PBT is used as the resin. Also, the temperature of the surfaces of molds was set to 60° C., and the temperature of the resin was set to 260° C.

The shapes of the resin layers of the models obtained through the simulation ware analyzed, and for each of the models, the direction and amount of mold shrinkage at the following three positions were obtained.

Model 1 (see FIG. 1)
- Analysis position A1: side, on the −x side, of the front-end edge
- Analysis position A2: side, on the +z side, of the front-end edge
- Analysis position A3: side, on the +x side, of the front-end edge
- (The analysis position A1 and the analysis position A3 are arranged in symmetry with the analysis position A2 interposed therebetween)

Model 2 (see FIG. 9)
- Analysis position B1: longitudinal end edge on the −x side
- Analysis position B2: side, on the +z side, of the front-end edge
- Analysis position B3: longitudinal end edge on the +x side
- (The analysis position B1 and the analysis position B3 are arranged in symmetry with the analysis position B2 interposed therebetween)

Test Results

Figure 10:
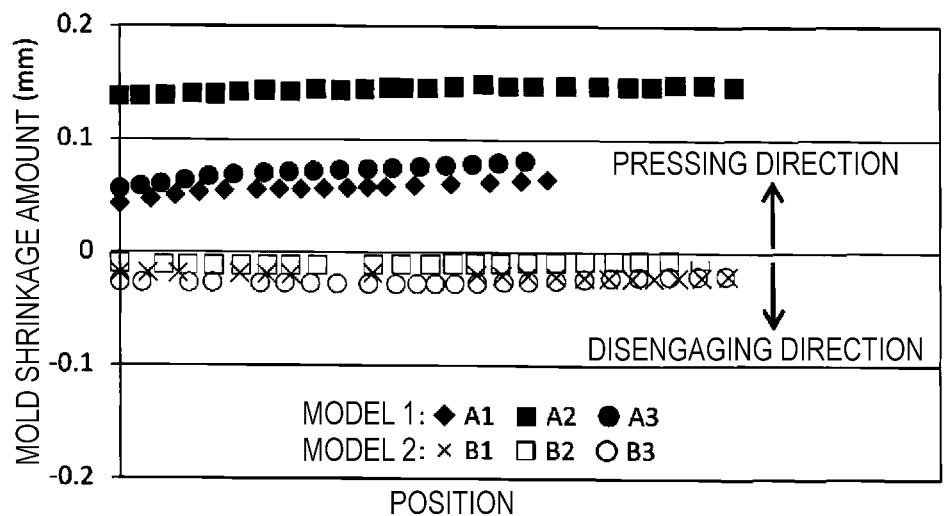
FIG. 10 illustrates analysis results showing amounts of shrinkage in the front-end edge of the second covering layer.

FIG. 10 shows a distribution of amounts of mold shrinkage of the models 1 and 2 at the analysis positions obtained through the simulation. The lateral axis indicates the respective analysis positions along the sides. The vertical axis denotes the direction and amount of mold shrinkage, where the "+" side indicates the direction of pressing against the lower-side first covering layer, and the "−" side indicates the direction of disengaging from the lower-side first covering layer.

Based on FIG. 10, in the model 2, mold shrinkage in the disengaging direction occurred at all of the analysis positions. In contrast, in the model 1, mold shrinkage in the pressing direction occurred at all of the analysis positions. Accordingly, it is clear that when, as the model 1, the front-end edge of the second covering layer serving as a covering end edge that covers the first covering layer is provided over the entire periphery except for a bottom region, mold shrinkage occurs in the direction in which the second covering layer presses the first covering layer, and the second covering layer is likely to adhere to the first covering layer.

While some embodiments of the present disclosure have been described above in detail, the present disclosure is not limited to the embodiments described above and can be modified in various ways without departing from the spirit of the present disclosure.

Also, the embodiments of the present disclosure have a configuration in which the second covering layer that covers the gap portion, which is provided at a halfway position in the longitudinal direction of the first covering layer, has the front-end edge serving as a covering end edge that covers the first covering layer at least over the entire periphery except for a bottom region. However, even in a case where a recess such as the gap portion is not provided in the first covering layer, the above-described problems can be solved by the configuration in which, when the first covering layer and the second covering layer are stacked on each other to form the resin covering portion, the second covering layer that covers the first covering layer has the front-end edge serving as the covering end edge that covers at least over the entire periphery except for a bottom region, in order to suppress a corrosion factor from entering via an interface between the first covering layer and the second covering layer and ensure the anticorrosive performance of the resin covering portion.

The invention claimed is:

1. A terminal-equipped wire in which a terminal fitting and a wire obtained by covering an outer periphery of a conductor with an insulating covering are electrically connected to each other at an electric connection, the terminal-equipped wire comprising:
   a resin covering that is made of a resin material, and covers the electric connection, wherein:
   the resin covering includes, in a region that covers at least part of the terminal fitting, a first covering layer that is in contact with a surface of the terminal fitting and a second covering layer that covers at least part of the first covering layer,
   the first covering layer has a recess, and the recess is covered by the second covering layer, and
   the recess is a gap in which the surface of the terminal fitting is not covered by a resin material that forms the first covering layer.

2. The terminal-equipped wire according to claim 1, wherein:
   the terminal fitting includes a barrel that is capable of crimping the wire, and
   the recess is provided at a position that corresponds to the barrel.

3. A terminal-equipped wire in which a terminal fitting and a wire obtained by covering an outer periphery of a conductor with an insulating covering are electrically connected to each other at an electric connection, the terminal-equipped wire comprising:
   a resin covering that is made of a resin material, and covers the electric connection, wherein:
   the resin covering includes, in a region that covers at least part of the terminal fitting, a first covering layer that is in contact with a surface of the terminal fitting and a second covering layer that covers at least part of the first covering layer,
   the first covering layer has a recess, and the recess is covered by the second covering layer,
   the second covering layer has a covering end edge that covers the first covering layer at an end, in a longitudinal direction, of the terminal-equipped wire, and
   the covering end edge of the second covering layer is provided at least over an entire periphery except for a region located in a bottomward direction, the bottomward direction intersecting with the longitudinal direction and being directed to a side opposite to a side on which the conductor is arranged on the terminal fitting.

4. The terminal-equipped wire according to claim 3, wherein:
   the first covering layer has higher adhesion to the surface of the terminal fitting than the second covering layer, and
   the covering end edge is located at a front-end of the second covering layer in the longitudinal direction of the terminal-equipped wire.

5. The terminal-equipped wire according to claim 3, wherein:
   the second covering layer has shrunk at the covering end edge of the second covering layer, in a direction of pressing against the first covering layer.

6. The terminal-equipped wire according to claim 3, wherein:
   at least in a portion that covers the terminal fitting, the second covering layer is not provided in the region located in the bottomward direction.

7. A wire harness comprising the terminal-equipped wire according to claim 1.

* * * * *